United States Patent Office 3,595,972
Patented July 27, 1971

3,595,972
OXIRANE AND EPISULFIDE POLYMERIZATION USING CATALYSTS BASED ON ALUMINUM PYROLATE
Arlen B. Mekler, Wilmington, Del., and Alfred E. Borchelt and Richard W. Sauer, Cherry Hill, N.J., assignors to Atlantic Richfield Company, Philadelphia, Pa.
No Drawing. Original application Mar. 2, 1967, Ser. No. 619,937, now Patent No. 3,489,691. Divided and this application Aug. 11, 1969, Ser. No. 862,128
Int. Cl. C08g 23/14
U.S. Cl. 260—79R                                    4 Claims

ABSTRACT OF THE DISCLOSURE

The pyrolysis of alkylaluminum compounds in a non-oxidizing, non-hydrolyzing environment produces a catalytically active solid which is characterized by the evolution of a hydrocarbon gas upon hydrolysis. Preferably, an alkylaluminum compound is heated at temperatures in excess of 400° F. for a time in excess of 6 hours. The catalyst can be utilized to promote various chemical reactions such as alkylation, polymerization, particularly epoxide polymerization, isomerization, dehydrogenation, hydrogenation, condensation, dealkylation, arylation, acylation and disproportionation. Various improvements are also obtained when this catalyst is combined with either a Lewis base, aluminum chelate or water.

---

This is a divisional of application Ser. No. 619,937, filed Mar. 2, 1967, now Pat. No. 3,489,691.

BACKGROUND OF INVENTION

It is well-known in the art to promote various chemical reactions such as polymerization, alkylation and isomerization with alkylaluminum compounds. For example, the polymerization of epoxides with triisobutylaluminum or with the reaction product of triisobutylaluminum with water or a chelating agent has been disclosed. It has now been discovered that alkylaluminum compounds when pyrolyzed in a non-oxidizing, non-hydrolyzing environment produce a catalytically active solid which can be used in the promotion of various chemical reactions including hydrogenation, isomerization and polymerization. Reactions catalyzed by this pyrolate produce high yields and excellent selectivity.

Therefore, it is an object of this invention to provide new compositions of matter which can be used to initiate various chemical reactions.

It is a further object of this invention to provide a method for promoting various chemical reactions.

In general, the catalyst of this invention comprises a catalytically active solid, hereafter called "aluminum pyrolate," prepared by pyrolyzing in a non-oxidizing, non-hydrolyzing environment an alkylaluminum compound having at least one alkyl group bonded to the aluminum atom, said pyrolysis being conducted at a temperature in excess of 400° F. for a time sufficient to produce a catalytically active solid which is characterized by the evolution of a hydrocarbon gas upon hydrolysis. Further improvements are obtained by combining this pyrolate with a compound selected from the group consisting of Lewis base, aluminum chelate and water.

The alkylaluminum compound must have at least one alkyl group bonded to the aluminum atom. While the specific structure of the alkyl group is not critical to the operability of the compound, it has been found that some configurations are more favorable for promoting certain reactions. For example, alkyl chains having from 1 to 10 carbon atoms and particularly those which are branched in structure are most suitable. The other two bonding sites on the aluminum atom can be occupied by alkyl groups or with other inorganic or organic radicals which are chemically inert to the alkyl portions of compound. For example, the compound can contain halogen, hydrogen and alkoxy radicals. It has been found most suitable that the aluminum compound contain at least two and preferably three alkyl radicals. Examples of suitable alkylaluminum compounds include but are not limited to: trimethylaluminum, triethylaluminum, triisohexylaluminum, tri-n-butylaluminum, triisopropylaluminum, tri-n-decylaluminum, di(isobutyl)ethylaluminum, di(isohexyl)isobutylaluminum, di(isopropyl)methylaluminum, ethyl(isopropyl)isobutylaluminum, methyl(ethyl)propylaluminum, diisobutylaluminum hydride, diethylaluminum hydride, diisopropylaluminum chloride, diisohexylaluminum propoxide, isobutyl(isopropyl)aluminum bromide, isopropyl(octyl)aluminum ethoxide, butyl(pentyl)aluminum hydride, isobutylaluminum dihydride, ethylaluminum dichloride, propoxy(isopropyl)aluminum hydride and butyl(iodo)aluminum hydride.

Mixtures of alkylaluminum compounds can also be pyrolyzed. For example, a pyrolate prepared from mixtures of from 10 to 90 percent by weight trialkylaluminum and from 10 to 90 percent of an alkylaluminum hydride provides an excellent catalyst for the polymerization of ethylene oxide and its 1-substituted derivatives. The pyrolysis is conducted under the same conditions utilized with a single alkylaluminum compound.

The pyrolysis is conducted by heating the alkylaluminum compound at a temperature in excess of 400° F. for a time sufficient to produce in good yield a catalytically active solid which is characterized by the evolution of a hydrocarbon gas upon hydrolysis. The exact range of conditions which will produce this catalyst vary with the particular alkylaluminum compound. For example, it has been found for most alkylaluminum compounds that temperatures in the range of 400° to 600° F. are required. If the temperature is less than 400° F., a liquid rather than a solid is obtained. This liquid has catalytic activity analogous to the parent compound triisobutylaluminum. If temperatures greater than 600° F. are utilized, a degradation occurs with most alkylaluminum compounds which produces a solid having essentially no catalytic activity. Once an active aluminum pyrolate is obtained, however, continued heating at the pyrolysis temperature does not destroy the activity. For example, heating at 400° F. for over 60 hours did not destroy the catalytic activity of pyrolate from triisobutylaluminum which had been formed after about 6 hours at this temperature. While formation of solid occurs from the beginning of the pyrolysis the minimum time necessary for high yields of a solid pyrolate is around 6 hours. Preferably, the temperature ranges from 400° to 500° F. and the time ranges from 8 to 20 hours. Most preferably, the temperature is about 440° F. and the time ranges from 6 to 8 hours.

The pyrolysis can be conducted in a closed system or under constant pressure by permitting controlled venting of the formed gases. If, however, the pressure of the system is maintained at too low a level, a reduction of the alkylaluminum compounds to inactive metallic aluminum occurs. Consequently, it is necessary to carry out the pyrolysis under pressures which allow the formation of a catalytically active solid. For the purpose of the specification and claims a catalytically active solid is obtained when at least 20 percent by weight of the solid pyrolate is composed of compounds having at least one carbon-to-aluminum bond. Preferably, the pyrolate contains at least 50 percent by weight of compounds having at least one carbon-to-aluminum bond. It has been found that pyrolysis under pressures of less than about 70 p.s.i.g. does not produce a pyrolate having sufficient catalytic activity. Preferably, the pressure ranges from 90 to 2,000 p.s.i.g.

and most preferably, from 200 to 600 p.s.i.g. While pressures higher than 2,000 p.s.i.g. can be utilized, safety and economic considerations make this type of pyrolysis less desirable. The pressure of the system may be either autogeneous or externally supplied by adding either a gas which is non-oxidizing, non-hydrolyzing to the aluminum compounds such as nitrogen, helium or argon, or hydrocarbon gases such as an olefin.

The pyrolysis may be carried out either in bulk or in the presence of an inert diluent such as heptane, benzene, xylene or Decalin. The concentration of alkylaluminum in the diluent is not critical and will normally range from 5 to 80 percent by weight. Preferably, the diluent is heptane.

The catalytically active pyrolate ranges in color from the yellowish-green of triisobutylaluminum pyrolates to the silver-gray solid obtained from triethyl- and tripropylaluminum compounds. The specific chemical structure of the pyrolate is not known. However, with solubility tests in solvents such as hydrocarbons and nitrogen containing hydrocarbons it has been ascertained that no alkylaluminum compounds corresponding to the structure of the intial reactants are present. The catalytic activity can be attributed to the presence of complex aluminum compounds, their presence being evidenced by the evolution of hydrocarbon gases upon hydrolysis. Depending upon the reaction conditions the amount of metallic aluminum produced can range in amounts up to 80 percent. Since this metal itself has no catalytic activity, high aluminum concentrations require higher pyrolate loadings in order to provide suitable catalytic activity.

The pyrolate can be used to promote chemical reactions. In general, it comprises contacting in a suitable reaction environment a chemical reactant with the aluminum pyrolate. It can be used in applications which are normally initiated by Friedel Crafts catalysts. For example, the pyrolate can be used to promote alkylation, isomerization, dehydrogenation, condensation, dealkylation, arylation, hydrogenation, acylation and disproportionation. It can also be used to initiate polymerizations and, in particular, epoxide polymerization. For example, the pyrolate of this invention can be utilized to polymerize alkylene oxides, episulfides, alkylimines and vinyl ethers, such as tertiary butyl vinyl ether. Any oxirane or oxetane compound can be homo- or copolymerized by this catalysis system. However, the use of this catalyst is most advantageous in the polymerization of ethylene oxide or its mono-substituted derivatives. Examples of the mono-substituted derivatives or ethylene oxide include but are not limited to the alkylene oxides such as 1,2-propylene oxide, 1-butene oxide, 4-methyl-1-pentene oxide and 3-methyl-1-butene oxide. Examples of other substituted alkylene oxides include but are not limited to halogenated oxides such as epichlorohydrin; cycloaliphatic epoxides such as cyclohexene oxide; epoxy ethers such as alkyl glycidyl ethers including methyl glycidyl ether, alkylphenyl glycidyl ethers and allyl glycidyl ethers; glycidyl esters such as glycidyl acetate, and other epoxides such as styrene oxide. Examples of suitable oxetane compounds include 1,3-propylene oxide (oxetane), 2-bromo oxetane, 2-methyl oxetane and 3,3 dichloromethyl oxetane. Additional examples of suitable oxetane monomers are set forth in U.S. Pat. No. 3,205,183 which is hereby incorporated by reference into this specification. Copolymers of various alkylene oxides such as propylene oxide with ethylene oxide, butadiene monoxide, isoprene monoxide or 4-vinylcyclohexane epoxide are also readily prepared with this catalyst.

The catalyst concentration can be varied over a wide range. The optimum concentration utilized will depend upon the reaction rate and ultimate conversion desired. It has been found that quantitative conversions have been obtained with molar ratios of monomer to aluminum in the pyrolate as high as 100 to 1 and as low as 10 to 1. Preferably, the molar ratio of monomer to aluminum ranges form 50 to 1 to 20 to 1. The novel catalyst of this invention can be combined with other well-known catalyst systems so long as the additional catalyst does not destroy the activity of the former.

The polymerization reaction can be carried out by contacting the monomer with the catalyst under conditions which bring about a conversion of monomers to polymer. For example, depending upon the particular monomers, the polymerization can be either a batch or a continuous process with either the catalyst or the monomer being added in its entirety initially or incrementally during the polymerization. The polymerization can be in bulk or solution. When the aluminum pyrolate is brought into contact with monomers, such as propylene oxide, in bulk a rapid, exothermic reaction occurs which may become uncontrollable. Therefore, in the practice of this invention it is advisable to contact the pyrolate with the monomer only in the presence of an inert diluent such as heptane, 1,4-dioxane or xylene. While bulk polymerizations can be utilized, suitable safety precautions should be taken. Similarly, care must be taken not to allow the catalyst to come in uncontrolled contact with an oxidizing system such as air or with water. The polymerization can be carried out over a wide range of temperature and pressure depending in part on the particular monomer used. Normally, the temperature can range from −120° F. to about 500° F. Most preferably, it is within the range of +80° F. to about 210° F. The polymerization pressure can be autogenous or superatmospheric.

Other functional ingredients can be added to the polymerization. For example, compounds to control molecular weight or to plasticize the resulting polymer can be added in functional amounts.

The polymers prepared by this invention can be used in film and coating applications such as food packaging.

It has also been found that the basic pyrolate systems of this invention can be advantageously modified by combining the pyrolate with an aluminum chelate containing three chelate rings bonded to the aluminum atom. The molar ratio of aluminum chelate to each gram-mole of aluminum in the pyrolate can range from 0.1 to 5 and preferably ranges from 1 to 3.

The aluminum chelate is prepared by reacting an aluminum compound with a chelating agent. The aluminum compound can be any in which the substituent groups can be replaced with a chelate group. For example, organic aluminum compounds such as triisopropoxyaluminum and triisobutylaluminum or inorganic aluminum compounds such as aluminum sulfate can be utilized. The chelating agent is defined as any organic compound which possesses at least two functional groups the donor atoms of which are capable of combining with the aluminum atom as the closing member. A discussion of chelating agents is set forth by F. P. Dwyer and D. P. Mellor in "Chelating Agents and Metal Chelates," Academic Press (1964).

It is critical to the practice of this invention that the aluminum chelate contain no active hydrogen. If an active hydrogen remains after formation of the aluminum chelate, it will react with the pyrolate and destroy the catalytic activity of the entire sysem. Preferably, the chelating agents contain either an —OH or a —SH group which interacts with the aluminum to form a conventional covalent aluminum to oxygen or aluminum to sulfur bond, and a second functional group which contains an oxygen, nitrogen or sulfur atom that forms a coordinate bond with the aluminum. The ring skeleton formed by the chelate preferably contains 5 or 6 atoms including the aluminum.

The most preferred chelating agents are beta-diketones containing at least one enolizable hydrogen such as acetylacetone, isovalerylacetone, 2,4-pentanedione, 2,4-decanedione, 1-phenyl-2,4-pentanedione, 5,5-dimethyl-2,4-hexanedione, 1-phenyl-1,3-butanedione and diisovaleryl methane. Aluminum chelates made from diketones higher than beta tend to undergo reduction when reacted with the organoaluminum compound unless the chelate ring is stabilized through conjugation with olefinic groupings. Examples of additional chelating agents useful in this invention include but are not limited to ketoacids such as acetoacetic acid; ketoesters such as ethyl acetoacetate; ketoaldehydes including formyl acetone; hydroxyketones such as hydroxyacetone; hydroxyaldehydes including hydroxy acetaldehyde; hydroxyesters such as hydroxymethyl acetate, ketoximes including 2,3-butane-dione-monoxime and dialdehyde monoximes such as glyoxal monoxime.

The aluminum chelate can be prepared by any suitable method. For example, it can be prepared by reacting an aluminum compound with a chelating agent. A discussion of this method is contained in The Journal of Inorganic and Nuclear Chemistry, volume 6, page 42 (1958). It is important, however, that all three bonding sites of the aluminum atom be occupied by a chelate ring. This requires, therefore, that three moles of chelating agent be reacted with 1 mole of aluminum compound. For example, tris(acetylacetonato)aluminum can be prepared by reacting 1 mole of a trialkylaluminum such as triisobutylaluminum with three moles of acetylacetone.

It has been disclosed (in U.S. Pat. No. 3,186,958) that the polymerization of epoxides can be improved by combining a di- or trialkylaluminum compound with ammonia, amine or urea. However, in that system the molar ratio of nitrogen-to-aluminum is critical and must be within a range of from 0.01:1 to about 0.095:1 and preferably, is within the range of from about 0.05:1 to about 0.5:1. When the molar ratio of nitrogen-to-aluminum exceeds these limitations, the catalytic activity of the reaction product is greatly reduced, if not completely erased. It has now been discovered that the catalytic activity of the pyrolate can be altered by reacting the aluminum pyrolate with a Lewis base. Particularly, in the polymerization of ethylene oxide and its 1-substituted derivatives this modified catalyst gives higher product selectivity. A Lewis base is defined as an organic compound which does not contain any active hydrogen and is capable of being bonded to the aluminum atom solely through a single coordinate bond.

Specifically, we have found that organic compounds which contain nitrogen, sulfur, oxygen, arsenic and phosphorous can be utilized. Nitrogen-containing Lewis bases such as trialkyl amines are particularly suitable. Unlike the system described in 3,186,958, there is no critical upper limit in the molar ratio of Lewis base to aluminum. In fact, experiments have been performed (see Polymerization No. 56) in which the Lewis base (triethylamine) was utilized as the diluent for the polymerization (ratio of N to Al=28.8, m./m.) without any adverse effects on the catalytic activity.

Examples of various Lewis bases which can be utilized include, but are not limited to nitrogen containing compounds such as pyridine, triethylene diamine, trimethylamine, triethylamine, N-alkyl piperidine, and dimethyl formamide; sulfur containing compounds such as tetrahydrothiophene, ethyl thioether, dimethylsulfoxide, methyl thiophenol; oxygen containing compounds such as tetrahydrofuran, 1,4-dioxane, and diphenyl ether; phosphorous containing compounds such as phenyl diethyl phosphine, tributyl phosphine and triphenyl phosphine; and arsenic containing compounds such as triphenyl arsine and trialkyl arsines.

The Lewis base can be combined with the aluminum pyrolate merely by bringing the two compounds into contact with each other at ambient or elevated temperatures. For example, the Lewis base may be dissolved in a non-reacting diluent and added to the aluminum pyrolate. A short reaction time, i.e., 30 minutes, should usually be observed before utilizing the mixture as a catalyst.

It has been found that aging of the catalyst is very advantageous with certain Lewis base systems. For example, as demonstrated in Example XI the total polymer yield obtained from an aluminum pyrolate/dimethylsulfoxide system is increased over 250 percent by aging the system at 100° C. for 18 hours. With other modifiers such as triethylamine, however, similar aging had no advantageous effects. It has also been found that certain Lewis bases are more efficient modifiers in a particular reaction than others. Consequently, in reactions having broad working ranges such as isomerization, alkylation and polymerization, optimization studies should be conducted to determine the best modifier and the optimum concentration.

It has been found that the addition of water to the pyrolate increases the activity of the catalyst. Since the water contains an active hydrogen, it is necessary that it be utilized in amounts less than 1.5 moles per gram atom of aluminum in the pyrolate in order to prevent a destruction of substantially all of the catalytic activity. Preferably, the ratio of water ranges from 0.2 to 1 and most preferably is 0.5 moles/gram atom of aluminum. The water can be reacted with the pyrolate merely by bringing the two substances in contact with each other in an inert diluent.

In the utilization of this catalyst in alkylation, isomerization, polymerization and so forth, reaction conditions and equipment which are well-known in the art can be utilized. In many cases, the invention can be practiced merely by replacing a recognized catalyst with the aluminum pyrolate.

The following examples are given to demonstrate specific embodiments of this invention and should not be construed as limitations upon the scope of the invention. The term "inherent viscosity" is used for comparison of molecular weights. A description of this term is found in "Textbook of Polymer Chemistry," W. F. Billmeyer, Jr., Interscience Publishers, Inc., New York, New York (1957), page 128. The term "isobutylene insolubles" is used to describe the residue of solid polymer which remains after a Soxhlet extraction using isobutylene as the extractant. Conversion is based on the amount of monomer charged. Reference to the use of Soxhlet apparatus for the selective extraction of polymers is found in "Techniques of Polymer Polymerization," P. W. Allen, Director, Academic Press, Inc., New York (1959), page 246. The catalyst loadings unless otherwise specified are based on moles of monomer per gram atom of aluminum in the pyrolate.

EXAMPLE I

Into a dried, nitrogen purged, heavy walled Pyrex glass tube of 60 ml. volume was placed 1.25 g. (6.3 mmoles) of redistilled triisobutylaluminum and 10 ml. of dry heptane. The system was evacuated, sealed and heated for 10 hours at 440° F. The resulting product upon cooling to room temperature was a mixture of a low boiling, clear liquid and a greenish-yellow solid. The solid about 0.4 g. was isolated by vaporization of hydrocarbon volatiles under vacuum at 86° to 110° F. The isolated solid evolved hydrocarbon gases upon hydrolysis.

EXAMPLE II

Into a 150 ml. stainless steel cylinder, dried and nitrogen purged, was charged 40 ml. (156 mmoles) of redistilled triisobutylaluminum. The cylinder was closed and heated for 10 hours at 440° to 450° F. during which a 550 p.s.i.g. pressure developed. After cooling, the cylinder was vented and evacuated to remove hydrocarbon products. A yellow-green solid (10 g.) which evolved hydrocarbon gases upon hydrolysis was isolated.

In Examples III to V the polymerizations were conducted as follows unless otherwise indicated:

To a nitrogen flushed heavy walled Pyrex glass tube was charged triisobutylaluminum pyrolate (from Example II) 10 ml. of alumina-percolated heptane and 3.62 g. (4.34 ml.; 62.5 mmoles) of propylene oxide (distilled over $CaH_2$). The tube was sealed under vacuum and placed in a shaker oil bath. After polymerization, the tube was opened and the contents added to 200 ml. of benzene. The solution was extracted with 50 ml. of 10% HCl, washed twice with 50 ml. of distilled water and once with 50 ml. of a saturated sodium chloride solution and finally dried over anhydrous magnesium sulfate. The polymer was then isolated from the benzene solution by freeze-drying techniques.

EXAMPLE III

The alkylaluminum compounds set forth in Table 3.1 were subjected to pyrolysis at 440° F. for 10 hours under the procedure given in Example II. The ratio of monomer to aluminum (m./m.) was 25/1. The polymerizations were carried out at 230° F., with agitation, for 48 hours. All polymerizations produced solid polymers.

TABLE 3.1

| Polymerization Number | Catalyst | Total polymer yield, percent |
|---|---|---|
| 1 | Al(i-hexyl)$_3$ pyrolate | 76 |
| 2 | Al(n-propyl)$_3$ pyrolate | 80 |
| 3 | Al(ethyl)$_3$ pyrolate | 36 |
| 4 | Al(n-butyl)$_3$ pyrolate | 76 |
| 5 | AlEt$_2$Cl pyrolate | 77 |

EXAMPLE IV

Triisobutylaluminum was heated in accordance with Example II at 440° F. for the periods specified in Table 4.1. The polymerizations were carried out at a monomer/aluminum ratio of 25/1 (m./m.). All polymerizations produced solid polymers.

TABLE 4.1

| Polymerization Number | Catalyst pretreatment, hrs. | Total polymer yield, percent | Conversion to isobutylene insoluble, percent |
|---|---|---|---|
| 6 | 10 | 77 | 51 |
| 7 | 16 | 80 | 55 |
| 8 | 40 | 73 | 42 |
| 9 | 64 | 71 | 53 |

EXAMPLE V

The following copolymerizations were conducted at 176° F. under a nitrogen atmosphere for 18 hours. Two moles of propylene oxide were combined with the designated moles of each comonomer set forth in Table 5.1. The diluent was benzene in a 0.28/1 ratio (v./v.) of propylene oxide to benzene. The monomer/aluminum ratio was 20/1 (m./m.). All polymerizations produced solid polymers.

TABLE 5.1

| Polymerization Number | Comonomer Type | Mole percent in feed charge | Total polymer yield, percent |
|---|---|---|---|
| 10 | Allyl glycidyl ether | 2 | 68 |
| 11 | Allyl glycidyl ether | 12 | 55 |
| 12 | 4-vinylcyclohexene monoxide | 2 | 73 |
| 13 | 4-vinylcyclohexene monoxide | 12 | 50 |
| 14 | 1,7-octadiene monoxide | 2 | 56 |
| 15 | 1,7-octadiene monoxide | 12 | 57 |
| 16 | Glycidyl methacrylate | 2 | 55 |
| 17 | Glycidyl methacrylate | 12 | 15 |

In Examples VI to VIII the polymerizations were conducted as follows unless otherwise indicated:

To a nitrogen flushed heavy walled Pyrex glass tube was charged triisobutylaluminum pyrolate, (from Example II) 10 ml. of alumina-percolated heptane and 3.62 g. (4.34 ml.; 62.5 mmoles) of propylene oxide (distilled over CaH$_2$). The tube was sealed under vacuum and placed in a shaker oil bath. After polymerization, the tube was opened and the contents added to 200 ml. of benzene. The solution was extracted with 50 ml. of 10% HCl, washed twice with 50 ml. of distilled water and once with 50 ml. of a saturated sodium chloride solution and finally dried over anhydrous magnesium sulfate. The benzene solution was then evaporated in the hood and finally dried in the vacuum oven for 18 hours with a nitrogen bleed.

EXAMPLE VI

Triisobutylaluminum was pyrolyzed in accordance with Example II at 440° F. for the time specified in Table 6.1. Polymerization of propylene oxide was conducted at 176° F. for 72 hours with a monomer/aluminum ratio of 25/1 (m./m.). It is apparent from the data that inadequate pyrolysis produces a catalyst which is not capable of producing high molecular weight (e.g. solid) polymers.

TABLE 6.1

| Polymerization Number | Pyrolysis time, hrs. | Polymer Yield, percent | Type |
|---|---|---|---|
| 18 | 0.5 | 67 | Oil. |
| 19 | 2 | 18 | Oil. |
| 20 | 7.5 | 56 | Solid. |
| 21 | 18 | 47 | Do. |

EXAMPLE VII

Triisobutylaluminum was pyrolyzed in accordance with Example II for 10 hours at the temperature specified in Table 7.1. Polymerization of propylene oxide was conducted at 186° F. for 72 hours in heptane diluent with a monomer/aluminum ratio of 25/1 (m./m.). It is apparent from the data that pyrolysis at too low a temperature creates a catalyst which is not capable of producing solid polymers.

TABLE 7.1

| Polymerization Number | Pyrolysis Temp., ° F. | Products | Polymer Yield, percent | Type |
|---|---|---|---|---|
| 22 | 302 | No solid | 41 | Oil. |
| 23 | 347 | do | 53 | Oil. |
| 24 | 392 | A solid | 41 | Oily solid. |
| 25 | 437 | do | 47 | Solid. |

EXAMPLE VIII

Triisobutylaluminum pyrolate from Example II was reacted with water in the amounts specified in Table 8.1 by combining the two components at room temperature. This product was utilized as a catalyst for propylene oxide polymerization at a ratio of 25/1 monomer/aluminum (m./m.). The polymerization was conducted at 176° F. for 3 days. The resultant polymers were solid. The data demonstrates that even small amounts of water are beneficial to polymer conversions.

TABLE 8.1

| Polymerization Number | Added H$_2$O/ aluminum (m./m.) | Polymer yield, percent |
|---|---|---|
| 26 | 0.00 | 47 |
| 27 | 0.02 | 62 |
| 28 | 0.02 | 84 |

EXAMPLE IX

The following polymerizations were run in sealed Pyrex glass tubes under a nitrogen atmosphere at a monomer/diluent ratio of 0.15 to 0.40 (v./v.) and at a monomer-Al ratio (m./m.) of 25/1. The catalyst as specified was mixed in 1.4 dioxane at 79° F. under dry nitrogen, monomer was added, the tube was flushed and sealed under dry nitrogen. Polymerizations were carried out with agitation at the temperature and time indicated in Table 9.1. The polymers were isolated by methanol precipitation from acidified water. This example sets forth specific examples of Lewis bases or aluminum chelates which can be used to modify the pyrolate. Of particular interest is the result of polymerization number 29 which demonstrates that unpyrolyzed alkylaluminums are not capable of producing high molecular weight (solid) polymers even after modifications with a Lewis base.

polymerizations redistilled propylene oxide was combined with alumina percolated dioxane and catalyst. The monomer to diluent ratio ranged 0.15 to 0.35 (v./v.) and the monomer to aluminum ratio was 25/1 (m./m.). Polym-

TABLE 9.1

| Polymerization No. | Catalyst [1] | Total polymer yield, percent | Isobutylene insolubles [3] Percent conversion to— | Isobutylene insolubles [3] Inherent viscosity [2] |
|---|---|---|---|---|
| At 212° F. for 8 hours: | | | | |
| 29 | TIBA/0.5 TEA | 67 | 0 | ([4]) |
| 30 | AP/0.5 TEA | 73 | 68 | ([5]) |
| At 212° F. for 24 hours: | | | | |
| 31 | AP | 82 | 35 | 1.28 |
| 32 | AP/0.5 TEA | 90 | 82 | 3.82 |
| 33 | AP-1/0.5 TEA | 74 | | |
| 34 | AP/0.5 THT | 89 | 67 | 3.33 |
| 35 | AP/0.5 DMF | 62 | 56 | 5.63 |
| 36 | AP/0.5 THF | 75 | 30 | 1.01 |
| 37 | AP/0.5 DMSO | 27 | 13 | 1.52 |
| At 230° F. for 48 hours: | | | | |
| 38 | AP/0.2 Al (acac)$_3$ | 93 | 47 | 1.27 |
| 39 | AP/0.5 R$_3$P | ([3]) | 49 | 1.48 |
| 40 | AP/0.25 TEA | 98 | 68 | |
| 41 | AP/0.5 TEA | ([3]) | 90 | 4.71 |
| 42 | AP/1.0 TEA | ([3]) | 91 | 5.19 |
| 43 | AP/3.0 TEA | ([3]) | 93 | 5.53 |

[1] Moles of modifier as designated per mole of aluminum in pyrolate.
[2] Inherent viscosity 0.2% in o-dichlorobenzene at 30° C.
[3] Quant.
[4] Opaque viscous oil.
[5] Solid polymer.
TIBA=Triisobutylaluminum.
AP=Aluminum pyrolate prepared by pyrolyzing triisobutyl aluminum at 440° F. for 8 hours under the procedure described in Example II.
AP-1=Aluminum pyrolate prepared by pyrolyzing AlEtCl$_2$ for 48 hours at 572° F.
TEA=Triethylamine.
THT=Tetrahydrothiophene.
DMF=Dimethyl formamide.
THF=Tetrahydrofuran.
DMSO=Dimethyl sulfoxide.
Al(acac)$_3$=Trisacetylacetonatoaluminum.
R$_3$P=Tris-n-butyl phosphine.

EXAMPLE X

To a nitrogen flushed heavy walled Pyrex glass tube was charged triisobutylaluminum pyrolate, 10 ml. of alumina-percolated heptane and 3.62 g. (4.34 ml.; 62.5 mmoles) of propylene oxide (distilled over CaH$_2$). The tube was sealed under vacuum at 212° F. for 6 hours and placed in a shaker oil bath. After polymerization the tube was opened and the contents added to 200 ml. of benzene. The solution was extracted with 50 ml. of 10% HCl, washed twice with 50 ml. of distilled water and once with 50 ml. of a saturated sodium chloride solution and finally dried over anhydrous magnesium sulfate. The polymer was then isolated from the benzene solution by freeze-drying techniques. The polymers were tack free, colorless solids.

When dioxane was substituted for heptane the workup involved addition of polymerizate to excess water acidified with HCl followed by washing with water and drying to isolate solid polymers.

erization was conducted at 212° F. for 6 hours. The polymers were tack free, colorless solids. A 250 percent increase in yield is obtained with 18 hour aging of dimethylsulfoxide modified catalyst. However, similar aging of triethylamine modified catalyst does not improve the yield.

TABLE 11.1

| Polym. No. | Catalyst [1] | Aging °C. | Aging Hrs. | Yield total polymer, percent | Conversion to isobutylene insolubles percent |
|---|---|---|---|---|---|
| 57 | AP/0.5 TEA | None | | 52 | 50 |
| 58 | AP/0.5 TEA | 100 | 0.5 | 53 | 52 |
| 59 | AP/0.5 TEA | 100 | 18 | 50 | 48 |
| 60 | AP/0.5 DMSO | None | | 26 | 14 |
| 61 | AP/0.5 DMSO | 100 | 0.5 | 32 | 22 |
| 62 | AP/0.5 DMSO | 100 | 18 | 93 | 77 |

[1] As defined in Table 9.1.
AP=Aluminum pyrolate prepared by pyrolyzing triisobutylaluminum at 440° F. for 8 hours under the procedure described in Example I.
TEA=Triethylamine.
DMSO=Dimethylsulfoxide.

TABLE 10.1

| Polymerization Number | Catalyst [1] | Solvent | Molar ratio, monomer/Al | Percent yield, total polymer | Conversion to isobutylene insolubles |
|---|---|---|---|---|---|
| 44 | AP | Heptane | 50/1 | 90 | 25 |
| 45 | AP | do | 25/1 | 82 | 20 |
| 46 | AP/0.5 TEA | do | 100/1 | 61 | 43 |
| 47 | AP/0.5 TEA | do | 50/1 | 99 | 67 |
| 48 | AP/0.5 TEA | do | 25/1 | 99 | 71 |
| 49 | AP/0.5 TEA | do | 12.5/1 | 72 | 59 |
| 50 | AP/0.5 TEA | Dioxane | 100/1 | 48 | 42 |
| 51 | AP/0.5 TEA | do | 50/1 | 95 | 80 |
| 52 | AP/0.5 TEA | do | 25/1 | 99 | 90 |
| 53 | AP/1.0 TEA | do | 100/1 | 51 | 45 |
| 54 | AP/1.0 TEA | do | 50/1 | 91 | 80 |
| 55 | AP/1.0 TEA | do | 25/1 | 99 | 91 |
| 56 | AP/28.8 TEA | do | 25/1 | 51 | 48 |

[1] As defined in Table 9.1.
AP=Aluminum pyrolate prepared by pyrolyzing triisobutylaluminum at 440° F. for 8 hours under the procedure described in Example II.
TEA=Triethylamine.

EXAMPLE XI

Table 11.1 demonstrates the effect of aging the pyrolate catalyst. Aging was conducted under a nitrogen atmosphere at the temperature and time designated. In all of the

EXAMPLE XII

The following polymerizations were run in sealed Pyrex glass tubes under a nitrogen atmosphere at a monomer/diluent ratio of 0.15 to 0.35 (v./v.) and at a monomer/

Al ratio (m./m.) of 25/1. The catalyst, aluminum pyrolate or aluminum pyrolate with 0.5 triethylamine (Al/TEA-m./m. was mixed in 1,4-dioxane at 79° F. under dry nitrogen, monomer was added, the tube was flushed and sealed under dry nitrogen and polymerization was carried out at 212° F. with agitation, for the specific time. The polymers were colorless solids.

as the diluent. The yield of colorless, tack free polymer was 15 percent.

Attempts to obtain methanol insoluble polymer at room temperature and above using t-butyl vinyl ether were not successful. Thus, with unmodified aluminum pyrolate the preferred polymerization conditions for alkyl ethers are low temperature (below −20° C.) and a non-reactive

TABLE 12.1

| Polymerization number | Monomer | Catalyst [1] | Reaction time (hours) | Total polymer yields, percent | Inherent viscosity |
|---|---|---|---|---|---|
| 63 | 4-methyl-1-pentene oxide | AP/0.5 TEA | 8 | 14 | [2] 10 |
| 64 | 1,3-propylene oxide | AP/0.5 TEA | 24 | 38 | [3] 5.9 |
| 65 | Styrene oxide | AP/0.5 TEA | 8 | 23 | |
| 66 | Epichlorohydrin | AP/0.5 TEA | 8 | 12 | [2] 0.76 |
| 67 | Propylene oxide | AP/0.5 TEA | 8 | 55 | [3] 3.13 |
| 68 | do | AP | 24 | 82 | [3] 1.28 |
| 69 | Propylene sulfide | AP/0.5 TEA | [4] 48 | 100 | [3] 0.93 |

[1] As defined in Table 9.1.
[2] Inherent viscosity 0.2% in Decalin at 100° C.
[3] Inherent viscosity 0.2% in o-dichlorobenzene at 30° C.
[4] At 110° C.

AP=Aluminum pyrolate prepared by pyrolyzing triisobutylaluminum at 440° F. for 8 hours under the procedure described in Example II.
TEA=Inherent viscosity 0.5% in benzene at 30° C.

EXAMPLE XIII

The following polymerizations were run in stirred reactors in a nitrogen atmosphere at a monomer/diluent ratio of 0.15 to 0.35 (v./v.) and at a monomer/Al ratio (m./m.) of 25/1. The catalyst, aluminum pyrolate or aluminum pyrolate with 0.5 triethylamine, or aluminum pyrolate with 0.5 $H_2O$ (m./m., Al/modifier) was mixed in methylene chloride, the temperature was lowered by means of a Dry Ice-acetone bath to −108° F. and monomer was added slowly with a syringe. After polymerization the polymer was isolated and purified by precipitation, digestion and washing with acidified excess methanol. The polymers were tack free, colorless solids.

diluent with a relatively high dielectric constant.

EXAMPLE XV 4-vinylcyclohexene was reacted in bulk with triisobutyl aluminum pyrolate (from Example II) at reactant to pyrolate ratio of 37 (w./w.) for 24 hours at 150° C. Conversion to 4-ethylidenecyclohexene was 5 percent.

We claim:
1. A method for polymerizing a monomer selected from the group consisting of vicinal monoepoxides and vicinal monoepisulfides which comprises contacting said monomer in a suitable polymerization environment with a catalyst which forms on mixing:

TABLE 13.1

| Polymerization number | Monomer | Catalyst [1] | Reaction time (hours) | Total polymer yield, percent | Inherent viscosity [2] |
|---|---|---|---|---|---|
| 70 | 2-methyl-2-butene oxide | AP/0.5 TEA | 22 | 9 | |
| 71 | do | AP | 18 | 15 | 0.32 |
| 72 | do | AP/0.5 $H_2O$ | 18 | 22 | 0.26 |
| 73 | Cyclohexane epoxide | AP | 18 | 100 | 1.30 |
| 74 | do | AP/0.5 TEA | 20 | 35 | 0.35 |
| 75 | do | AP/0.5 $H_2O$ | 18 | 84 | 2.90 |

[1] As defined in Table 9.1.
[2] Inherent viscosity 0.5% in benzene at 30° C.

AP=Aluminum pyrolate prepared by pyrolyzing triisobutylaluminum at 440° F. for 8 hours under the procedure described in Example I.
TEA=Triethylamine.

EXAMPLE XIV

Triisobutylaluminum pyrolate (from Example 11) and dichloromethane were mixed under nitrogen in a stirred reactor (catalyst/$CH_2Cl_2$=0.012, w./w.) and the temperature was lowered by means of a Dry Ice-acetone bath. Purified monomer, t-butyl vinyl ether, 7.6 g., in 20 ml. of $CH_2Cl_2$ was added slowly over a ten minute period using agitation. The final ratio of monomer to aluminum pyrolate was 4 (w./w.). The product was kept at low temperature for 21 hours and the polymer was isolated by decomposition of the mixture with excess, acidified methanol. A colorless, tack free polymer was obtained in 78% yield.

The above was repeated except that toluene was used (a) a catalytically active aluminum pyrolate prepared by pyrolyzing in a non-oxidizing, non-hydrolyzing environment an alkylaluminum compound having at least one alkyl group bonded to the aluminum atom, and wherein the remaining valences of the aluminum atom are satisfied by radicals selected from the group consisting of alkyl and halogen radicals, said pyrolysis being conducted at a temperature in excess of 400° F. for a time sufficient to produce a catalytically active solid which is characterized by the evolution of hydrocarbon gases upon hydrolysis, with (b) a compound selected from the group consisting of a Lewis base, water and an aluminum chelate having five or six member chelate rings and containing no active hydrogen, wherein the aluminum chelate is utilized in an amount ranging from 0.1 to 5.0 moles per gram mole of aluminum in the pyrolate and the water is present in an amount less than 1.5 moles per gram of aluminum atom in the pyrolate.

2. A method according to claim 1 wherein the monomer is ethylene oxide.

3. A method according to claim 1 wherein the monomer is propylene oxide.

4. A method according to claim 1 wherein the monomer is 4-methyl-1-pentene oxide.

References Cited

UNITED STATES PATENTS

| | | | |
|---|---|---|---|
| 3,135,705 | 6/1964 | Vandenberg | 260—2 |
| 3,285,861 | 11/1966 | Vandenberg | 260—2 |
| 3,324,051 | 6/1967 | Lal | 260—2 |
| 3,396,125 | 8/1968 | Wofford et al. | 260—2 |
| 3,408,313 | 10/1968 | Foll | 260—2 |
| 3,422,034 | 1/1969 | Calderon | 260—2 |
| 3,444,102 | 5/1969 | Ito et al. | 260—2 |
| 3,468,817 | 9/1969 | Hsieh | 260—2 |
| 3,483,135 | 12/1969 | Hsieh | 260—2 |

WILLIAM H. SHORT, Primary Examiner

E. A. NIELSEN, Assistant Examiner

U.S. Cl. X.R.

252—431R; 260—2A, 609A, 615B

PO-1050 (5/69)

UNITED STATES PATENT OFFICE
CERTIFICATE OF CORRECTION

Patent No. 3,595,972            Dated July 27, 1971

Inventor(s) Arlen B. Mekler, Alfred E. Borchert and Richard W. Sauer

It is certified that error appears in the above-identified patent and that said Letters Patent are hereby corrected as shown below:

Column 1, line 5, "Alfred E. Borchelt" should read:

"Alfred E. Borchert".

Signed and sealed this 23rd day of November 1971.

(SEAL)
Attest:

EDWARD M. FLETCHER, JR.
Attesting Officer

ROBERT GOTTSCHALK
Acting Commissioner of Patents